United States Patent
Brown et al.

(10) Patent No.: US 6,978,803 B2
(45) Date of Patent: Dec. 27, 2005

(54) FLUE CAP

(75) Inventors: Kenneth J. Brown, Warr Acres, OK (US); Tammy D. Brown, Warr Acres, OK (US); Mark A. Temple, Oklahoma City, OK (US)

(73) Assignee: K&M Plastics, LLC, Oklahoma City, OK (US)

( * ) Notice: Subject to any disclaimer, the term of this patent is extended or adjusted under 35 U.S.C. 154(b) by 0 days.

(21) Appl. No.: 10/856,577

(22) Filed: May 28, 2004

(65) Prior Publication Data
US 2005/0166985 A1   Aug. 4, 2005

Related U.S. Application Data

(60) Provisional application No. 60/541,551, filed on Feb. 4, 2004.

(51) Int. Cl.⁷ .......................... F23L 17/02; F16L 55/10
(52) U.S. Cl. .................... 138/96 R; 220/287; 215/319; 454/367
(58) Field of Search ........................ 138/96 R, 96 T; 220/799, 287; 215/319; 454/367, 372, 366.1

(56) References Cited

U.S. PATENT DOCUMENTS

| | | | | |
|---|---|---|---|---|
| 510,884 | A * | 12/1893 | Bradley | 454/367 |
| 1,139,129 | A * | 5/1915 | Lyons | 222/68 |
| 1,371,669 | A * | 3/1921 | Davis | 220/202 |
| 2,277,982 | A * | 3/1942 | Hosbein | 454/368 |
| 2,488,249 | A * | 11/1949 | White | 261/114.2 |
| 2,873,765 | A * | 2/1959 | Gregory | 138/96 R |
| 3,031,783 | A * | 5/1962 | Burke | 40/660 |
| 3,807,457 | A * | 4/1974 | Logsdon | 138/89 |
| 3,884,134 | A * | 5/1975 | Jordan | 454/10 |
| 4,285,440 | A * | 8/1981 | Adams | 220/202 |
| 4,399,743 | A * | 8/1983 | Izzi, Sr. | 454/367 |
| 5,374,121 | A * | 12/1994 | Draenert | 366/242 |
| 5,645,347 | A * | 7/1997 | Draenert | 366/242 |
| 5,678,720 | A * | 10/1997 | Van Melle | 220/287 |
| 5,915,418 | A * | 6/1999 | Turner | 138/89 |

OTHER PUBLICATIONS

Photograph of standard plumbing fittings attached to the flue, taken in Jan., 2004.
Photograph of standard plumbing fittings attached to the flue, taken in Jan., 2004.
Photograph of standard plumbing fittings attached to the flue, taken in Jan., 2004.

* cited by examiner

Primary Examiner—Patrick Brinson
(74) Attorney, Agent, or Firm—Fellers, Snider, et al.; Mitchell McCarthy (57) ABSTRACT

A flue cap is provided comprising a body defining a plurality of attachment surfaces adapted for selectively matingly engaging a selected flue from a plurality of different size flues. The flue cap comprises a polymer material defining an attachment surface that is adapted for a close mating engagement with an outer diameter of the selected flue and defines an aperture establishing a passageway in fluid communication with the flue and passing through the cap. A flue assembly is constructed by steps comprising providing an open end of the flue; providing a flue cap comprising a polymer material defining an attachment surface that is adapted for a close mating engagement with an outer diameter of a flue, bonding the flue cap to the flue with an adhesive; and flowing a fluid out the open end of the flue and through the flue cap.

19 Claims, 5 Drawing Sheets

FLUE CAP

CLAIM OF PRIORITY

This application claims the benefit of United States provisional patent application Ser. No. 60/541,551 filed Feb. 4, 2004.

FIELD OF THE INVENTION

This invention relates generally to the field of pipe components and more particularly without limitation to a pipe cap for shielding the open end of a pipe from environmental elements.

BACKGROUND OF THE INVENTION

There are a number of instances in building construction where a conduit, such as a round pipe, is routed to atmosphere at an open distal end. The roof of virtually any commercial or residential building will typically have one or more penetrations through which such pipes project. Some of these pipes are used for venting, such as for plumbing drains, furnace exhausts, and the like.

Usually, just leaving upwardly projecting pipe ends exposed to environmental elements is unacceptable. Left unshielded, rain, snow, dirt and debris will enter the open end and travel into the equipment at the other end of the pipe. In an exhaust line for a high efficiency furnace, for example, this environmental contamination can adversely affect the pressure controls that are designed to safely monitor the removal of combustion by-products from the building living spaces.

While it is thus important to shield the open end of a furnace flue pipe, in doing so it is equally important not to overly restrict the flow of flue gas in the pipe. An overly restricted flow passage can, at the best, cause nuisance lockouts of the furnace controls because of the high head pressure or can, at the worst, create unintended flow paths of the flue gases within or around the furnace. Accordingly, a building owner cannot afford to simply rely on a contractor's judgment which might haphazardly or arbitrarily construct such a shielding device.

While various proposed attempts have been found operable with varying success and reliability, there remains a need for improvements in the manner in which such pipes are shielded. It is to these improvements and others as exemplified by the description that embodiments of the present invention are directed.

SUMMARY OF THE INVENTION

In accordance with preferred embodiments, an apparatus is provided for shielding the open end of a pipe.

In some embodiments a pipe cap is provided comprising a body defining a plurality of attachment surfaces adapted for selectively matingly engaging a selected pipe from a plurality of different size pipes.

In other embodiments a pipe cap comprising a polymer material defines an attachment surface that is adapted for a close mating engagement with an outer diameter of a pipe, and defines an aperture establishing a passageway in fluid communication with the pipe and passing through the cap.

In other embodiments a pipe assembly is constructed by steps comprising providing an open end of a pipe; providing a pipe cap comprising a polymer material defining an attachment surface that is adapted for a close mating engagement with an outer diameter of the pipe; bonding the pipe cap to the pipe with an adhesive; and flowing a fluid out the open end of the pipe and through the pipe cap.

These and various other features and advantages which characterize the claimed invention will become apparent upon reading the following detailed description and upon reviewing the associated drawings.

BRIEF DESCRIPTION OF THE FIGURES

FIG. 6 is a cross sectional view of a cap comprising an assembled two-piece construction in accordance with embodiments of the present invention.

DETAILED DESCRIPTION

Figure 1:
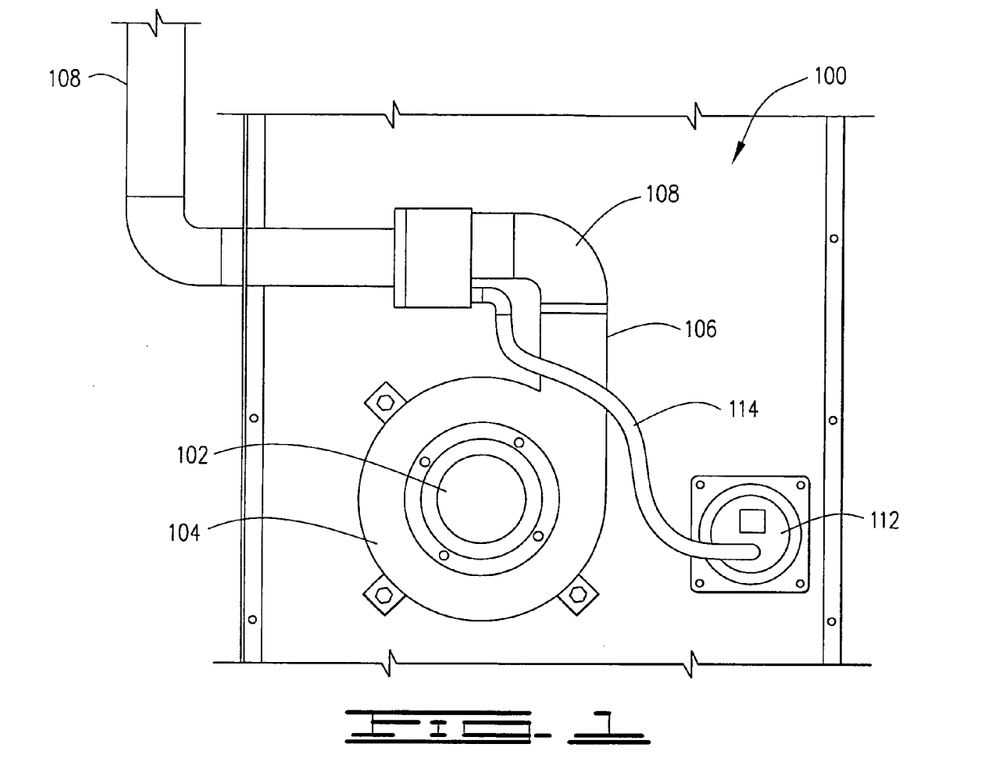
FIG. 1 is an elevational view of a gas furnace suited for use with embodiments of the present invention.

FIG. 1 is an elevational view of portion of a gas furnace 100 that is suited for use in practicing the embodiments of the present invention. The furnace 100 has an inducer motor 102 (sometimes called a ventor motor) for drawing combustion by-products (or flue gases) from a combustion area (not shown). The motor 102 drives as impeller (not shown) inside a housing 104 that is in fluid communication with the combustion area. The rotating impellor draws flue gases from the combustion area and through as outlet 106 portion of the housing 104. A conduit 108, or "pipe" 108 or more particularly in some embodiments "flue" 108, is connected to the outlet 106 at a proximal end thereof, and extends away from the furnace 100 to remove the flue gases from the inhabited living spaces served by the furnace 100. Typically, the pipe 108 terminates after passing through a penetration in either an exterior wall or the roof.

In the illustrative use employed with the furnace 100 of FIG. 1 the conduit 108 is a round plastic pipe, such as a polyvinyl chloride (PVC) pipe. The embodiments of the present invention are not so limited to use with round plastic pipe, but rather contemplate use with non-round and non-plastic conduits as well. A complete enumeration of all types of conduits with which the present novel features and advantages can be realized is not necessary for an understanding of the present invention.

FIG. 1 also shows a drain tube 114 connected to the pipe 108 for draining any residual fluids to a drain (not shown). Another drain tube (not shown) permits drainage from the combustion chamber. The tube 114 can become restricted and possibly clogged by environmental elements such as precipitation, dirt and debris entering the distal end of the pipe 108 and settling in the tube 114, or in the downstream drain. This can lead to a serious degradation of the reliability of the furnace 100, such as premature corrosion and/or failure of a pressure switch 112 safety device. It can also lead to nuisance lock-outs of the furnace 100 combustion cycle.

A skilled artisan recognizes that leaving the distal end of the pipe 108 unshielded is not a satisfactory arrangement because it increases the likelihood that environmental elements, such as debris, rain or snow, will enter the pipe 108. Accordingly, it is desirable to shield the distal end of the pipe 108 from the environmental elements. However, the shielding cannot adversely affect the inducer motor's 102 ability to exhaust flue products from the furnace 100. Namely, the shielding cannot result in overly restricting the pipe 108 so as to impede the exhausting of flue gases or to increase the static pressure enough to adversely affect the pressure switch 112 operation.

Figure 2:
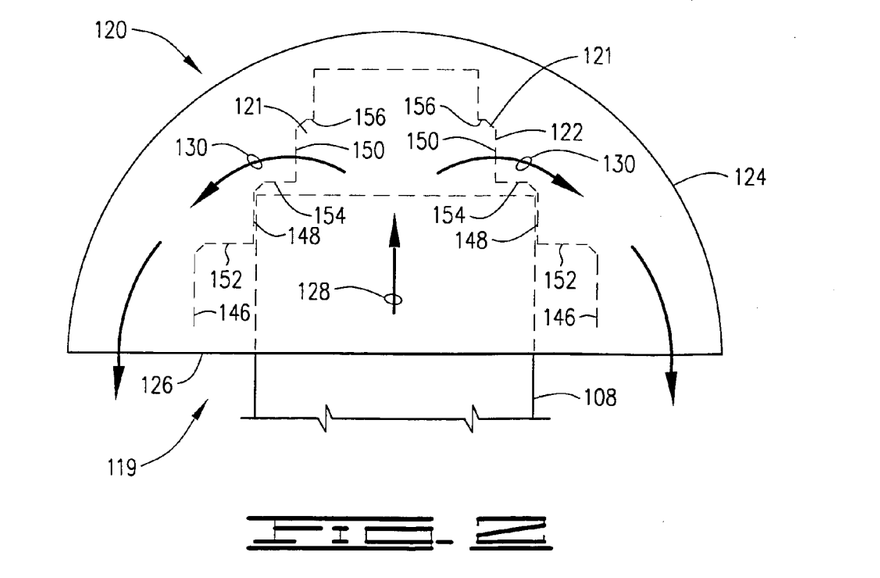
FIG. 2 is a diagrammatic elevational view of a pipe assembly constructed in accordance with embodiments of the present invention.

FIG. 2 is a diagrammatic elevational illustration of a pipe assembly 119 comprising a cap 120 and the pipe 108. In some embodiments the cap 120 can be used with a vertically disposed pipe 108 distal end; alternatively, the cap can be used with the pipe 108 disposed in non-vertical orientations.

The cap 120 comprises a body 122 that is attachable to the pipe 108. The cap 120 defines an aperture 121 establishing a fluid passageway, indicated by the reference numeral 130, through the body 122. The cap 120 furthermore comprises a shroud 124 depending from the body 122, circumscribing the aperture 121, and terminating at an open end 126. By "circumscribing" it is meant that the shroud 124 radially surrounds the aperture 121 along the entire longitudinal extent of the aperture 121. In other words, the open end 126 defined by the terminal end of the shroud is beyond the distant end of the aperture 121, with respect to the central portion of the shroud 124. This circumscribing relationship of the shroud 124 provides optimal shielding of environmental elements from the aperture 121.

In this arrangement a fluid flow 128 leaving the pipe 108 passes through the body 122 and is redirected by the shroud 124 through the open end 126 along the flow passage 130. By extending the shroud 124 so as to circumscribe the aperture 121, the cap 120 effectively shields the open end of the conduit 108 from environmental elements from all directions.

FIGS. 3–7 illustrate a manner of making the cap 120 from a two-piece construction by joining the body 122 and the shroud 124. In this arrangement the body 122 and the shroud 124 are well-suited for manufacture by injection molding processes. In some embodiments a polymer material sold by General Electric Company under the product name Geloy can be used to manufacture the component parts. Geloy is an advanced amorphous terpolymer of acrylic-styrene-acrylonitrile (ASA). This material retains its color and mechanical properties under long-term exposure to ultraviolet radiation, moisture and heat. It is well-suited for injection molding and blow molding.

Figure 3:
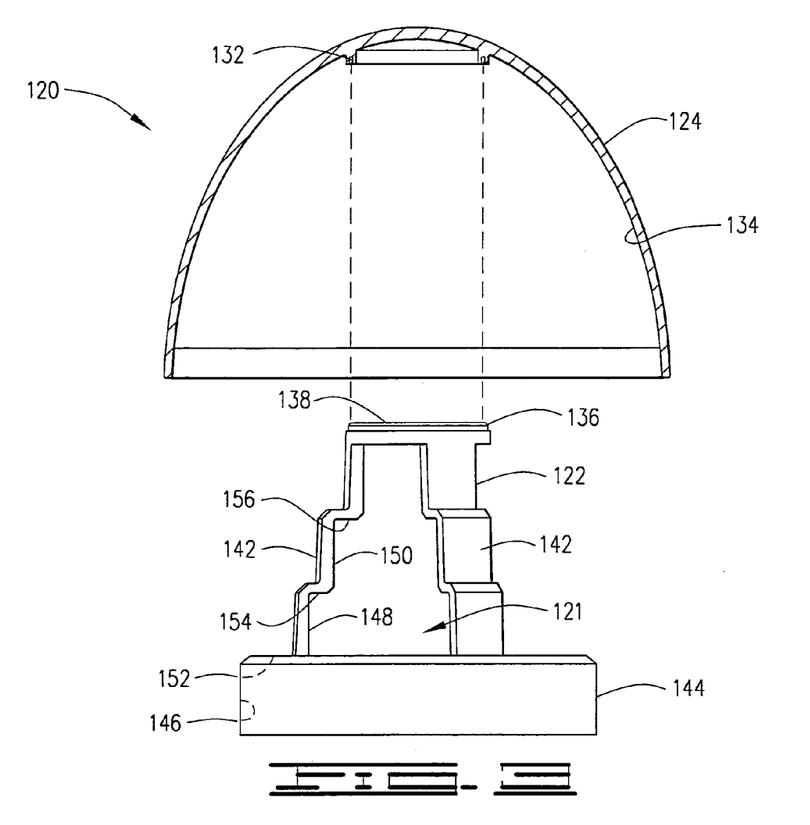
FIG. 3 is an elevational view of the body of FIG. 2 and a partial cross sectional view of the shroud of FIG. 2 illustrating a two-piece component construction in accordance with embodiments of the present invention.

The cross-sectional view of the shroud 124 in FIG. 3 shows an annular receiving groove 132 is formed at a central portion of an arcuate surface 134 defining the dome-shaped shroud 124. The body 122 has an annular protuberant member 136 that is sized to be receivingly engaged in the groove 132 of the shroud 124. Preferably, the protuberant member 136 has a tapered leading edge 138 to facilitate the insertion of the protuberant member 136 into the groove 132 during assembly operations. After assembling the body 122 to the shroud 124, the components can be permanently joined at joint 140 (FIG. 5) such as with an adhesive or by other joining processes such as but not limited to sonic welding.

Figure 4:
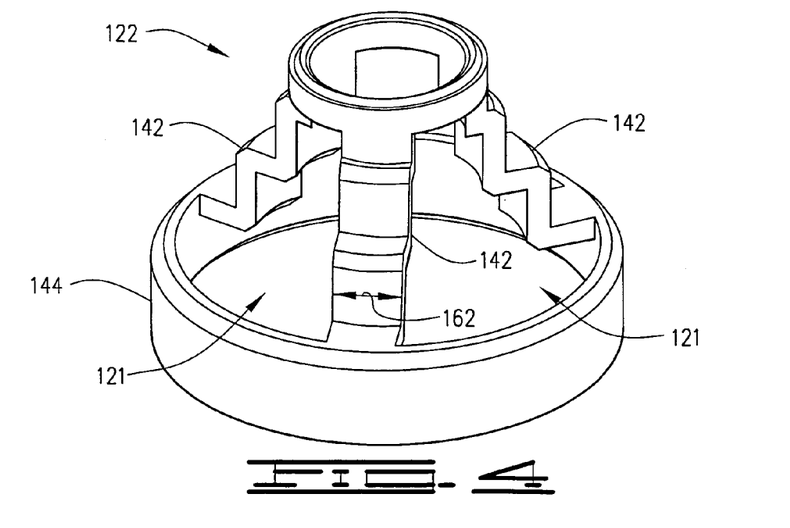
FIG. 4 is an isometric view of the body portion of the cap of FIG. 2 constructed in accordance with embodiments of the present invention.
Figure 5:
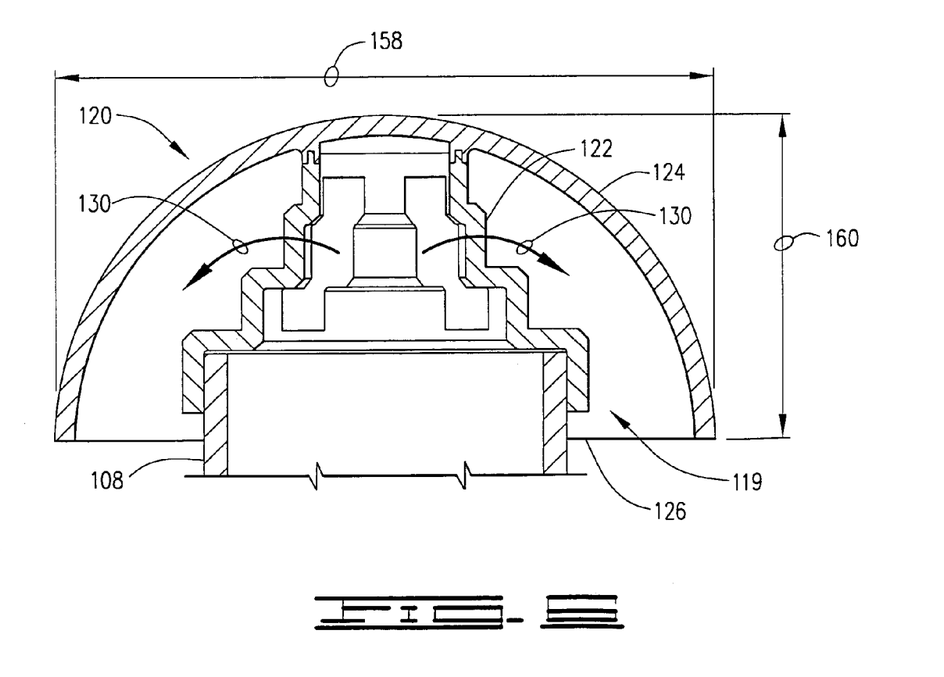
FIG. 5 is an enlarged detail of a portion of the assembled cap of FIG. 6.

In the present illustrative embodiments the body 122 comprises a plurality of support members 142, each extending from a proximal end adjacent the shroud 124 and each terminating at a distal end adjacent to a base member 144. A plurality of the apertures 121 are defined between adjacent support members 142.

Preferably, the support members 142 are minimally sized for the adequate structural integrity while maximizing the size of the apertures 121 for reduced flow restriction. Also, preferably the support members 142 are substantially equally sized and equidistantly arranged so that the apertures 121 define the flow passage 130 (FIG. 1) so as to distribute the fluid flow 128 (FIG. 1) substantially evenly around the shroud 124. In some embodiments, as illustrated presently, the support members 142 are disposed in a triangulated arrangement for an optimal strength and flow restriction tradeoff.

The body 122 can define an attachment surface that is adapted to matingly engage a selected size pipe 108 to simplify the installation of the cap 120. Preferably, the body 122 defines a plurality of different sized attachment surfaces so as to be adapted to matingly engage a selected plurality of different pipe 108 sizes. This permits the use of a single cap 120 with different size pipes, enabling the user to reduce the inventory of caps 120 necessary to complete a given job.

In the present illustrative embodiments the base member 144 defines an arcuate attachment surface 146 for matingly engaging an outer diameter surface of a pipe 108. The support members 142 also cooperatively define attachment surfaces 148, 150 for different size pipes. FIG. 2 illustrates the pipe 108 receivingly engaged by the attachment surface 148.

By forming the cap 120 of a polymer material, the attachment surfaces 146, 148, 150 can be defined so as to provide a close mating engagement with the outer diameter of standard size pipe. For example, for standard 1.5 inch, 2 inch and 3 inch PVC pipe, attachment surfaces 146, 148, 150 defining diameters of 1.60 inches, 2.38 inches, and 3.50 inches, respectively, result in a mating engagement between the attachment surfaces 146, 148, 150 and the pipe 108 with clearance suited for bonding the cap 120 to the pipe 108 with standard adhesives and associated PVC pipe joint makeup methodologies.

The characteristic stair-stepped arrangement of the support members 142 can also provide abutting stop surfaces to positively position the pipe 108 to the respective attachment surface 146, 148, 150. Namely, an abutting surface 152 offers a positive engagement of the cap 120 when using the attachment surface 146; likewise abutting surfaces 154, 156 provide positive engagement of the cap 120 when using the attachment surfaces 148, 150, respectively.

The attachment surfaces 146, 148, 150 can be preselected according to expected pipe 108 sizes that are associated with a particular use of the cap 120. For example, the cap 120 of the present illustrative embodiments used with gas furnace 100 flue pipes can be provided with attachment surfaces 146, 148, 150 adapted to matingly engage 1.5 inch, 2 inch and 3 inch pipes. FIG. 6 shows a cap 120 constructed for these size conduits 108 can be compactly sized with an open end 126 diameter, designated by reference numeral 158, of about 6.4 inches and a longitudinal length, designated by reference numeral 160, of about 3.2 inches. Adequate flow passage 130 for venting the flue gas of the furnace 100 (FIG. 1) is achieved by forming the support members 142 with a width, designated by reference numeral 162 (FIG. 4), of about 0.6 inches. For this arrangement, it was found the support members 142 can be formed in the range of 0.100 inches to about 0.150 inches thick, and the shroud 124 can be formed about 0.100 inches thick.

Figure 7:
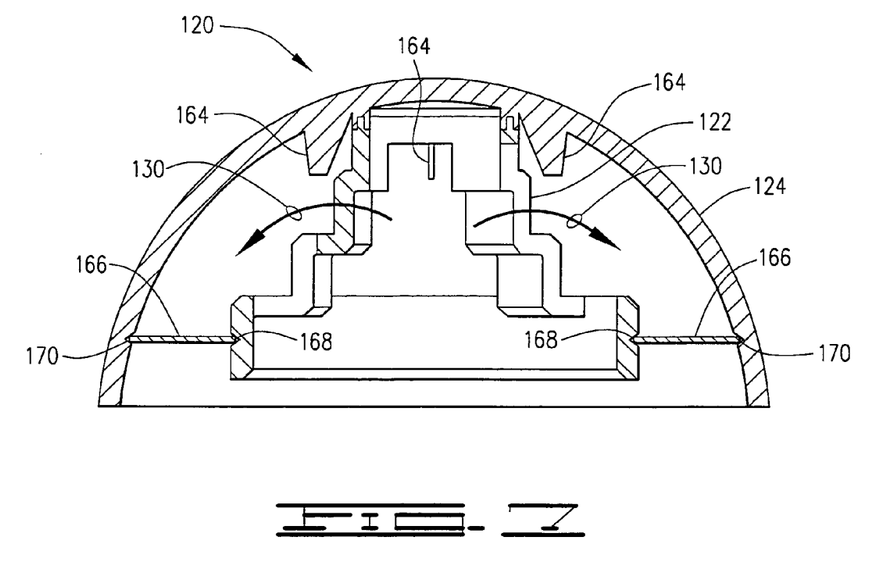
FIG. 7 is a partial cross sectional view of the cap of FIG. 6 but furthermore showing stiffening flanges in the shroud and a filter member in the fluid passage.

FIG. 7 shows another cross-sectional view of the cap 120 illustrating three stiffener flanges 164 that are formed as part of the shroud 124 for enhancing the structural integrity. FIG. 7 also illustrates in some embodiments a filter member 166, such as a mesh screen, can be disposed in the flow passage 130 to further prevent environmental elements and varmints from entering the aperture 121. The filter member 166 can be a ring-shaped member that snaps into place in receiving apertures 168, 170 in the body 122 and the shroud 124, respectively.

As discussed above, in some embodiments the attachment surfaces 146, 148, 150 are disposed to matingly engage with an outer diameter surface of the conduit 108. In other embodiments the attachment surfaces can otherwise matingly engage the conduit 108.

Figure 8:
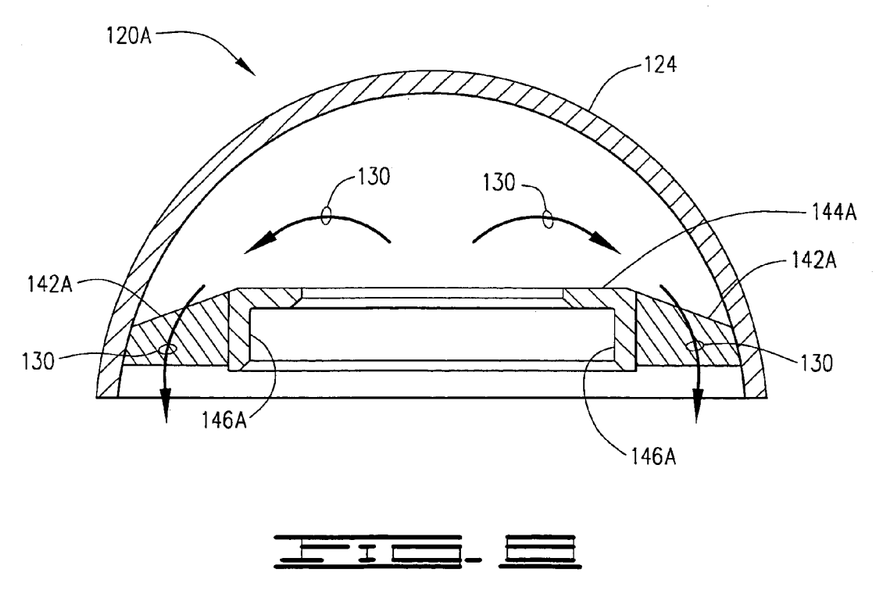
FIG. 8 is a cross sectional view of a cap constructed in accordance with alternative embodiments of the present invention.

FIG. 8 illustrates a cap 120A wherein the shroud 124 is supported by support members 142A of a relatively simpler construction. Such an arrangement can be better suited for a unitary construction. Alternatively, the cap 120A can likewise be constructed by making the support members 142A part of the base member 144A, or part of the shroud 124, or individual parts assembled to both the base member 144A and the shroud 124.

The support members 142 of the illustrative embodiments are directed substantially longitudinally along the body 122. Alternatively, the support members 142 can be directed substantially orthogonally to the body 122, such as the support members 142A in FIG. 8; in other embodiments the support members 142, 142A can be directed at some angle between orthogonally and longitudinally to the body 122.

The shroud 124 of the illustrative embodiments is substantially semi-hemispherically shaped. In alternative equivalent embodiments the shroud can be apportioned into one or more segments, or can be alternatively formed. An enumeration of all possible configurations of the shroud 124 and support members 142 is not necessary for a skilled artisan to understand the nature and scope of the present invention.

Figure 9:
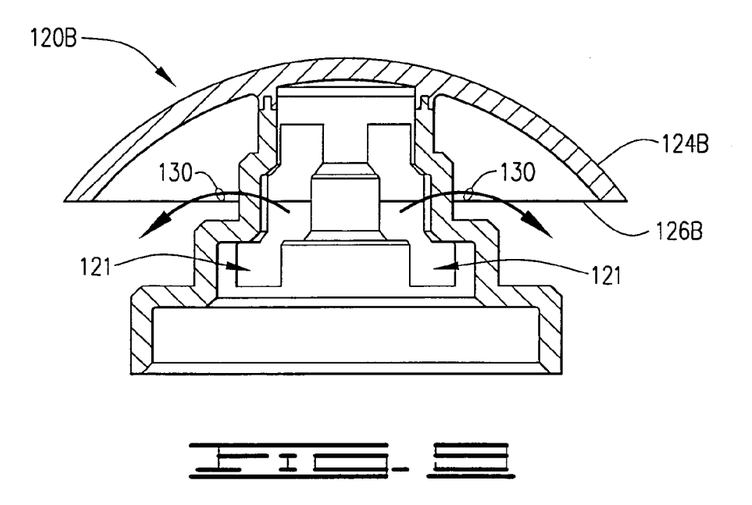
FIG. 9 is a cross sectional view of a cap constructed in accordance with alternative embodiments of the present invention.

FIG. 9 shows a cap 120B illustrative of embodiments wherein the shroud 124B terminates at an open end 126B that does not extend beyond the aperture 121. In these embodiments the shroud 124B is adjacent the aperture 121, shielding it from environmental elements in some but not all directions. In other words, the shroud 124 does not circumscribe the aperture 121.

Figure 10:
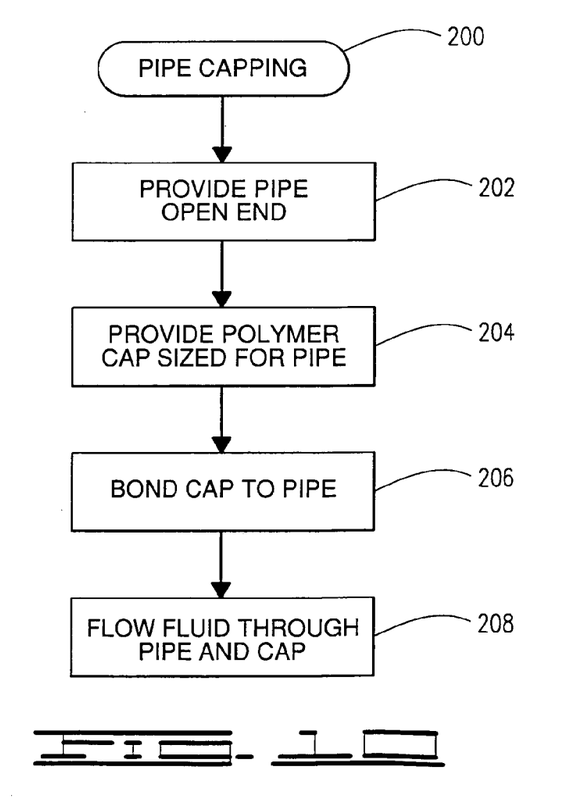
FIG. 10 is a flowchart for a PIPE CAPPING routine generally illustrative of steps carried out in accordance with embodiments of the present invention.

FIG. 10 provides a flowchart for a PIPE CAPPING routine 200 generally illustrative of steps carried out in accordance with preferred embodiments of the present invention. The routine 200 begins at block 202 by providing an open end of a selected pipe 108. In block 204 a pipe cap 120 is provided that has an attachment surface adapted for a close mating engagement with the outer diameter of the pipe provided at block 202. In block 206 the cap 120 selected in block 204 is bonded to the pipe 108 provided in block 202, owing to the polymer material of the cap 120 and to the close mating engagement between the attachment surface of the cap 120 and the pipe 108. With the cap 120 attached to the pipe 108, then in block 208 a fluid is flowed out the end of the pipe 108 and through the cap 120.

Summarizing generally, a pipe cap (such as 120) comprises a body (such as 122) defining a plurality of attachment surfaces (such as 146, 148, 150) adapted for selectively matingly engaging a selected pipe (such as 108) from a plurality of different size pipes. The body defines an aperture (such as 121) establishing a fluid passageway (such as 130) through the body. A shroud (such as 124) depends centrally from the body and extends distally adjacent the aperture. In some embodiments a medial portion of the shroud circumscribes the aperture.

The body can comprise a plurality of support members (such as 142) supporting the shroud and defining a plurality of the apertures between adjacent support members. The body can comprise a base member (such as 144) connected to the support members opposite the shroud, the base member defining one of the attachment surfaces, and the support members can define one of the attachment surfaces.

In other embodiments a pipe cap is provided comprising a polymer material defining an attachment surface that is adapted for a close mating engagement with an outer diameter of a pipe, and defining the aperture establishing the fluid passageway in fluid communication with the pipe and passing through the cap. The pipe cap can define a plurality of attachment surfaces adapted for selectively matingly engaging a selected pipe from a plurality of different size pipes. The pipe cap can comprise a shroud disposed laterally in the passageway. In some embodiments a portion of the shroud circumscribes the aperture. The pipe cap can comprise a plurality of support members supporting the shroud and defining a plurality of the apertures between adjacent support members. The pipe cap can comprise the base member connected to the support members opposite the shroud, the base member defining one of the attachment surfaces, and the support members can define one of the attachment surfaces.

In other embodiments a pipe assembly is provided that is constructed by steps comprising providing an open end of a pipe; providing a pipe cap comprising a polymer material defining an attachment surface that is adapted for a close mating engagement with an outer diameter of the pipe; bonding the pipe cap to the pipe with an adhesive; and flowing a fluid out the open end of the pipe and through the pipe cap.

The providing step can comprise providing an open end of a selected size pipe from a plurality of different size pipes. The providing a pipe cap step can comprise providing a pipe cap defining a plurality of attachment surfaces adapted for selectively matingly engaging the selected pipe from the plurality of different size pipes. The providing a pipe cap step can comprise providing a pipe cap defining an aperture establishing a passageway in fluid communication with the pipe and passing through the cap. The providing a pipe cap step can comprise providing a pipe cap comprising a shroud disposed laterally in passageway. The providing a pipe cap step can comprise providing a pipe cap wherein the shroud circumscribes the aperture.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. In addition, although the preferred embodiment described herein is directed to use on a furnace flue vent, it will be appreciated by those skilled in the art that the teachings of the present invention can be applied to other devices, so as to generally form pipe shielding devices, for example, without departing from the scope and spirit of the present invention.

What is claimed is:

1. A flue cap comprising;
   a shroud defining a cavity configured for receivingly surrounding an end of the flue;
   a plurality of support members each attached at proximal ends thereof to the shroud inside the cavity; and
   a unitary base commonly joined to all of the support members at distal ends thereof without using any mechanical fastener, the base defining an arcuate surface configured for receivingly engaging the end of the flue in a close mating engagement for attachment to the flue thereby operably shielding the flue from environmental elements while permitting a positive flow of flue gases through the flue cap.

2. The flue cap of claim 1 wherein the support members are clearingly disengaged from the shroud at medial portions thereof so that each defines a fluid passageway between the support member and the shroud.

3. The flue cap of claim 1 wherein the shroud is concave.

4. The flue cap of claim 1 further comprising a screen that is pervious to the flow of flue gases.

5. The flue cap of claim 1 wherein the base is annular.

6. The flue cap of claim 1 wherein the base and support members are unitarily constructed.

7. The flue cap of claim 1 wherein the support members define an arcuate surface configured for receivingly engaging the end of the flue in a close mating engagement for attachment to the flue.

8. A flue assembly for a positive flow in a flue comprising a polymeric flue can attached to an open end of the flue, the flue cap comprising:
   a shroud defining a cavity configured for receivingly surround the open end of the flue;
   a body supporting the shroud and bonded to the flue, wherein the bonded attachment provides the sole attachment forces between the flue cap and the flue, and wherein the body comprises:
   a plurality of support members, each attached at proximal ends thereof to the shroud inside the cavity; and
   a unitary base commonly joined to all of the support members at distal ends thereof without using any mechanical fastener, the base defining an accurate surface configured for receivingly engaging the open end of the flue in a close mating engagement for attachment to the flue, thereby operably shielding the flue from environmental elements while permitting a positive flow of flue gases through the flue cap.

9. The flue assembly of claim 8 wherein the shroud is concave.

10. The flue assembly of claim 8 wherein the flue can further comprises a screen that is pervious to the flow of flue gases.

11. The flue assembly of claim 8 wherein the base is annular.

12. The flue assembly of claim 8 wherein the base support unitarily constructed.

13. The pipe flue assembly of claim 8 wherein the support members define an arcuate surface configured for receivingly engaging the end of the flue in a close mating engagement for attachment to the flue.

14. A flue assembly constructed by steps comprising:
   providing an open end of a flue;
   providing a polymeric flue cap comprising a body, a shroud supported by a body comprising a plurality of support members and a unitary base commonly joined to all of the support members, the base defining
   an attachment surface that is adapted for a close mating engagement with a diameter of the flue; and
   bonding the flue cap to the flue with an adhesive for operably flowing a positive flow of flue gases out the open end of the flue and through the flue cap.

15. The flue assembly of claim 14 wherein the providing a flue step comprises providing an open end of a selected size flue from a plurality of different size flues.

16. The flue assembly of claim 15 wherein the providing a flue cap step comprises providing a flue cap defining a plurality of attachment surfaces adapted for selectively matingly engaging the selected flue from the plurality of different size flues.

17. The flue assembly of claim 14 wherein the providing a flue cap step comprises providing a screen that is pervious to the flow of flue gases.

18. The pipe assembly of claim 16 wherein the providing a flue cap step comprises unitarily constructing the portion of the flue cap defining the plurality of attachment surfaces.

19. The pipe assembly of claim 16 wherein the providing a flue cap step comprises a construction characterized by not using any mechanical fasteners.

* * * * *

UNITED STATES PATENT AND TRADEMARK OFFICE
CERTIFICATE OF CORRECTION

| | | |
|---|---|---|
| PATENT NO. | : 6,978,803 B2 | |
| APPLICATION NO. | : 10/856577 | |
| DATED | : December 27, 2005 | |
| INVENTOR(S) | : Kenneth J. Brown et al. | |

It is certified that error appears in the above-identified patent and that said Letters Patent is hereby corrected as shown below:

On title page, item 57 Abstract
  replace "of a flue, bonding"
  with --of a flue; bonding--.

Col. 7, line 37
  replace "flue can attached"
  with --flue cap attached--.

Col. 7, line 40
  replace "surround the open"
  with --surrounding the open--.

Col. 8, line 8
  replace "flue can"
  with --flue cap--.

Col. 8, line 13
  replace "base support unitarily"
  with --base and support members are unitarily--.

Col. 8, line 15
  replace "The pipe flue"
  with --The flue--.

UNITED STATES PATENT AND TRADEMARK OFFICE
CERTIFICATE OF CORRECTION

PATENT NO. : 6,978,803 B2
APPLICATION NO. : 10/856577
DATED : December 27, 2005
INVENTOR(S) : Kenneth J. Brown et al.

It is certified that error appears in the above-identified patent and that said Letters Patent is hereby corrected as shown below:

Col. 8, line 21
  replace "comprising a body, a shroud"
  with --comprising a shroud--.

Signed and Sealed this

Nineteenth Day of August, 2008

JON W. DUDAS
*Director of the United States Patent and Trademark Office*